United States Patent Office 3,640,958
Patented Feb. 8, 1972

3,640,958
PHENOLIC RESIN COMPOSITIONS MODIFIED WITH GROUP II METAL HYDROXIDES OR OXIDES AND A CAPROLACTONE
Anthony C. Soldatos, Kendall Park, N.J., assignor to Union Carbide Corporation, New York, N.Y.
No Drawing. Filed Apr. 1, 1969, Ser. No. 812,344
Int. Cl. C08g 5/18
U.S. Cl. 260—59                                    16 Claims

ABSTRACT OF THE DISCLOSURE

This invention relates to phenolic resin compositions modified with Group II metal hydroxides or oxides and an ε-caprolactone, which are characterized by relatively low viscosity and can be molded into shaped articles of desired configuration having excellent chemical and physical properties.

---

This invention relates to phenolic resin compositions containing Group II metal hydroxide or oxide and an ε-caprolactone. More particularly, this invention relates to phenolic resin compositions, containing a Group II metal hydroxide or oxide and an ε-caprolactone, which are characterized by relatively low viscosities and are excellently suited for use in molding applications to produce shaped articles of desired configuration having excellent physical and chemical properties.

Phenolic resin compositions have been modified by the addition thereto of various additives which are designed to upgrade various properties thereof. As an illustration, the addition of a Group II metal hydroxide such as calcium hydroxide to phenolic resins has been found to improve the hot-rigidity, that is, the rigidity at elevated temperatures, of shaped articles produced from such compositions.

The addition of calcium hydroxide to phenolic resin compositions, although improving the hot-rigidity of shaped articles produced therefrom, is undesirable in that it increases the viscosity of these compositions to an objectionable degree. In fact, calcium hydroxide, when added to phenolic resins increases the viscosity thereof to such as degree that the resultant compositions, when used in molding applications, are subject to molding shorts. That is, the viscosity of these compositions is so high that these compositions thermoset before adequately filling the mold cavity during the molding cycle. Furthermore, the relatively high viscosity of these compositions renders it extremely difficult to blend therewith other additives such as pigments, fillers and the like. Furthermore, in the case of phenolic resin compositions based on phenolic resole resins, the addition thereto of calcium hydroxide results, in many instances, in a premature gelation of the compositions.

The present invention provides phenolic resin compositions, containing a Group II metal hydroxide or oxide and an ε-caprolactone, having desirable low viscosities which allows for the successful use thereof in molding applications as these compositions are not prone to molding shorts and/or premature galation. The compositions of this invention, by reason of their relatively low viscosities, can be easily and readily blended with curing agents, pigments, fillers and other desired additives, to form compositions which can be molded into shaped articles of desired configuration characterized by excellent chemical and physical properties.

As stated, the compositions of this invention comprise a phenolic resin, that is, a phenol-aldheyde resin in admixture with a Group II metal hydroxide or a Group II metal oxide and an ε-caprolactone wherein the Group II metal hydroxide or oxide is present in an amount of about 1 percent to about 15 percent by weight, preferably about 2 percent by weight to about 10 percent by weight based on the solids content of the phenol-aldehyde condensate and the ε-caprolactone is present in an amount of about 1 percent to about 50 percent by weight, preferably about 5 percent by weight to about 25 percent by weight based on the solids content of the phenol-aldehyde condensate.

The solids content of the phenol-aldehyde resins is determined according to the following procedure, in those instances wherein the phenol-aldehyde resin is a liquid:

A 1.5 gram sample of the phenol-aldehyde resin is heated in an oven, which is at a temperature of 135° C., for three hours. The residue is then cooled to room temperature, i.e., 23° C. and weighed. The numerical weight of the residue is divided by the numerical weight of the sample and the result multiplied by 100. The result obtained represents the percent weight, on a solids basis, per 1.5 grams of liquid resin.

Suitable phenol-aldehyde resins, or more specifically suitable condensation products of a phenol and aldehyde, are the condensates, generally acid catalyzed, referred to as "novolac resins" and condensates, generally alkaline catalyzed referred to as "resole resins."

Condensates, referred to as "novolac resins" are usually prepared by condensing a phenol and an aldehyde in the presence of an acid such as oxalic acid, sulfuric acid and the like or in the presence of a metal salt of an acid such as zinc acetate; wherein the aldehyde is present in the reaction mixture in less than stoichiometric amounts. Novolac resins are generally fusible, brittle, grindable resins which can be converted to the infusible state by the addition thereto of a methylene generating agent such as hexamethylenetetramine.

Condensates generally referred to as "resole resins" are usually prepared by condensing a phenol and an aldehyde in the presence of a base such as an alkali metal oxide or hydroxide or an alkaline earth metal oxide or hydroxide, as for example, sodium hydroxide, potassium hydroxide, calcium hydroxide, calcium oxide and the like, or an amine, or ammonia; wherein the aldehyde is present in the reaction mixture in greater than stoichiometric amounts. The resoles can be either liquid resins, soft resins having a low melting point or hard, brittle, grindable resins and are heat-hardenable per se to the infusible state, that is, they will thermoset to infusible products under the influence of heat.

Illustrative of suitable phenols which can be condensed with an aldehyde to produce suitable phenol-aldehyde resins are the monohydric as well as the polyhydric phenols.

Among suitable monohydric phenols can be noted: phenols, and those phenols having the general formula:

Formula I

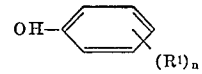

wherein $n$ is an integer having a value of 1 to 2 inclusive, each $R^1$, which can be the same or different, is an alkyl radical containing from 1 to 6 carbon atoms inclusive, an alkoxy radical containing from 1 to 6 carbon atoms inclusive, or a halogen, i.e., chlorine, bromine, iodine, and fluorine; with the proviso that at least 3 positions other than meta to the hydroxyl group are unsubstituted.

Specific phenols falling within the scope of Formula I are: alkylated phenols, exemplary of which are m-cresol, m - ethylphenol, m - propylphenol, m - isopropylphenol, m-sec-butylphenol, m-amylphenol, m-n-hexylphenol, 3,5-dimethylphenol, 3,5-diethylphenol, 3,5-di-n-hexylphenol, and other like phenols, as well as the commercially available meta-cresol which contains small amounts of both the para and the ortho isomers; alkoxylated phenols, exemplary of which are m-methoxyphenol, o-ethoxyphenol, p-propoxyphenol, m-n-hexoxyphenol, and the like; halogenated phenols such as meta chlorophenol, and m-bromophenol. Also suitable are cycloalkylphenols such as p-cyclopentenylphenol, p-cyclohexenylphenol and the like.

Among suitable polyhydric phenols can be noted resorcinol, and the like, as well as polyhydric, polynuclear phenols having the formula:

Formula II

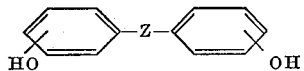

wherein Z is a divalent radical, as for example, sulfur, oxygen, alkylidene, alkylene and the like; as well as substituted derivatives of phenols falling within the scope of Formula II.

Exemplary of specific polyhydric, polynuclear phenols are the following: bis(hydroxyphenyl)alkanes such as 2, 2-bis(4-hydroxyphenyl)propane, commonly referred to as Bisphenol A, 2,4'-dihydroxydiphenylmethane, bis(2-hydroxyphenol)methane, bis(4-hydroxyphenyl)methane, 1, 1-bis(4-hydroxyphenyl)ethane, 1,2-bis(4-hydroxyphenyl) ethane, 1,1-bis(4-hydroxy-2-methylphenyl)ethane, 2,2 - bis (2-isopropyl - 4 - hydroxyphenyl)propane, 2,2-bis(4-hydroxyphenyl)pentane, 3,3 - bis(4-hydroxyphenyl)pentane, 2,2-bis(4-hydroxyphenyl)heptane, bis(4 - hydroxyphenyl) phenylmethane, bis(4-hydroxyphenyl)cyclohexylmethane, 1,2 - bis(4 - hydroxyphenyl)-1,2-bis(phenyl)propane, 2,2-bis(4-hydroxyphenyl)-1-phenylpropane and the like; dihydroxy biphenyls such as 4,4'-dihydroxybiphenyl, 2,2'-dihydroxybiphenyl, 2,4'-dihydroxybiphenyl and the like; di(hydroxyphenyl)sulfones such as bis(4-hydroxyphenyl)sulfone, 2,4'-dihydroxydiphenylsulfone, and the like; di(hydroxyphenyl)ethers such as bis(4-hydroxyphenyl) ether and the like.

Examples of aldehydes which can be condensed with the phenols listed above to produce the phenol-aldehyde resins are: formaldehyde in any of its available forms, i.e., Formalin and para-formaldehyde; furfural and the like.

For a detailed discussion of condensates produced from a phenol and an aldehyde and methods for the production thereof, reference is made to the books: "Phenoplasts" by T. S. Carswell, published in 1947 by Interscience Publishers and "Chemie der Phenolharze" by K. Hultzsch, Springer Verlag 1950.

Examples of hydroxides and oxides of Group II metals, for example beryllium, barium, cadmium, calcium, magnesium and zinc, suitable for purposes of this invention are the following: beryllium hydroxide, beryllium oxide, calcium hydroxide, calcium oxide, magnesium hydroxide, magnesium oxide and the like. Particularly desirable compounds are calcium hydroxide, calcium oxide, magnesium hydroxide and magnesium oxide.

Among suitable ε caprolactones for purposes of this invention are those having the formula:

Formula III

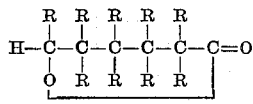

wherein each R, which can be the same or different, is hydrogen, halogen, i.e., chlorine, bromine iodine or fluorine or a monovalent hydrocarbon containing, generally, a maximum of 12 carbon atoms and preferably a maximum of 6 carbon atoms, wherein at least six of the R's are hydrogen.

Illustrative of suitable monovalent hydrocarbon radicals for R are the following: alkyl radicals such as methyl ethyl, n-propyl, 2-ethylhexyl, dodecyl, chloromethyl, bromoethyl, and the like, alkoxy radicals such as methoxy, ethoxy, n-propoxy, n-hexoxy, n-dodecoxy and the like; cycloaliphatic radicals such as cyclopentyl, cyclohexyl and the like; aryl radicals such as phenyl, ethylphenyl, n-propylphenyl, n-butylphenyl and the like; aryloxy radicals such as phenoxy, n-propylphenoxy, n-butylphenoxy and the like. Other suitable ε caprolactones are described in U.S. Pat. 3,169,945 to F. Hostettler et al.

Particularly desirable ε caprolactones, that is, lactones falling within the scope of Formula IV are the following: ε caprolactone, β-methyl-ε caprolactone, γ-methyl-ε caprolactone, δ-methyl-ε caprolactone, ε methyl-ε caprolactone, β,δ-dimethyl-ε caprolactone, β-chloro-ε caprolactone, γ-ethoxy-ε caprolactone, ε phenyl-ε caprolactone and the like.

It is to be understood that mixtures of the various phenol-aldehyde resins, Group II metal hydroxides, Group II metal oxides and ε caprolactones can be used if so desired. Also, compositions of this invention can be formulated using a Group II metal hydroxide and a Group II metal oxide in the same composition.

Also, the disclosures of all references noted in this application are incorporated herein by reference.

The compositions of this invention can be formulated by a number of convenient methods. A particularly preferred method of preparation is one wherein a condensate of a phenol and an aldehyde is prepared in a still and the desired hydroxide and/or oxide added directly thereto just prior to the dehydration of the condensate with the ε caprolactone added to the still after the dehydration step. As an illustration of this preferred method, a composition hereinafter referred to as Composition A was prepared as follows:

Composition A

Into a still there was charged 150 parts by weight of Formalin (37%) and 100 parts by weight phenol. Three parts by weight sodium hydroxide were then added and the contents in the still brought to a temperature of 80° C. and maintained at this temperature for 2 hours while under a pressure of 330 mm. of Hg. At the end of the two hour period, the contents of the still were neutralized and then brought to a pH of 3.50 to 4.50 by the addition thereto of boric acid (75%). Thereafter, 4 percent by weight of calcium hydroxide, based on the solids content of the phenol-formaldehyde condensate, were introduced into the still. The contents of the still were vacuum dehydrated up to a temperature of about 90° C. to about 100° C. under a pressure of about 75 mm. of Hg. At this point, 5 percent by weight ε caprolactone was added, based on the solids content of the phenol-formaldehyde condensate and the mixture heated at up to 100° C. The composition so obtained upon being cooled to room temperature, about 23° C., was grindable and heat-hardenable, that is, capable of thermosetting to an infusible product.

As another convenient method of formulating the compositions of this invention, a condensate of a phenol and an aldehyde can be compounded with an ε caprolactone and a Group II metal hydroxide or oxide, with or without other additives in a kneader to form homogeneous blended composition.

When the condensate of a phenol and an aldehyde which is to be used is a so-called novolac resin, it is customary to add to the composition a methylene-generating compound which will insure that the composition, when heated, will thermoset to an infusible product. Illustrative of such methylene generating compounds are hexamethylenetetramine, anhydro - formaldehyde - aniline, paraform and the like. A discussion of suitable methylene-generating compounds is to be found in the book by T. S. Carswell previously noted.

When used, the methylene generating compounds are employed in amounts of from about 5 percent by weight to about 20 percent by weight, preferably about 10 percent by weight based on the weight of the condensate of a phenol and an aldehyde. More than 20 percent by weight can be used but this is economically undesirable.

Also, if so desired, any of the conventional catalysts used to promote the thermosetting of phenolic resins can be used, in all instances, as an aid in thermosetting compositions of this invention. These catalysts, when employed, are used in amounts of from about 1 percent by weight to about 20 percent by weight, preferably from about 2 percent by weight to about 6 percent by weight based on the weight of the condensate of a phenol and an aldehyde. Exemplary of such catalysts are the alkali metal hydroxides such as sodium hydroxide, potassium hydroxide and the like.

Compositions of this invention can also contain various other additives, as are well known in the art. Illustrative of such additives, are the so-called fillers which are inert materials usually added to phenolic resin compositions in order to improve the physical characteristics thereof. Illustrative of such fillers are the following: The mineral fillers such as asbestos, wollastonite, mica, silica, graphite, and the like; and organic fillers such as woodflour, cotton flock, polyamide fibers, polyester fibers, graphite cloth, graphite fibers and the like.

Fillers, when used, are generally employed in amounts of from about 15 percent by weight to about 300 percent by weight based on the weight of the condensate of a phenol and an aldehyde calculated on a solids basis.

Other materials, commonly added to phenolic resin compositions, are lubricants such as carnauba wax, candelilla wax, calcium stearate and the like; and colorants such as titanium dioxide and the like; also, organic dyes such as nigrosine.

As previously pointed out, the compositions of this invention have particular utility as compositions which can be molded into articles of desired shape. The exact conditions under which compositions of this invention can be molded will, of course, vary depending, in part, upon the particular composition being molded and the configuration and size of the article being formed. As a general rule, suitable molding temperatures range from about 150° C. to about 200° C.

In the examples below, tests referred to were conducted as follows:

Cure speed—indicated by the "gel test"

This test was conducted by placing a one gram sample of the desired composition on a hot plate which was at a temperature of 150° C. The composition was stroked with a spatula and the time required to reach a "no string" condition noted. A "no string" condition is reached when there is no pulling of strings of material, by the spatula, from the main body of the composition. This time was noted as the gel time. A shorter gel time indicates a faster cure time.

Ball drop test

Standard ASTM cups, two inches in diameter, were molded at a temperature of 335° F. under a pressure of about 2500 using a 2 minute molding cycle. The cups were allowed to cool to room temperature and then placed under the path of a raised, 25 gram steel ball. The cups were struck with the ball, which was positioned at measured distances away from the cups until the cups shattered. The distance of each shattered cup, from the top of the trajectory of the steel ball was noted in inches.

Also, in the examples, Composition B was prepared as follows:

Composition B

One hundred parts by weight phenol and 73 parts by weight Formalin (37%) were admixed in a still and the pH thereof adjusted to 1.0–1.1 by th e addition thereto of oxalic acid. The mixture was then vacuum refluxed at a temperature of 90° C. to cloudiness. The temperature was gradually increased to 120° C. by the steady increase of pressure and reflux was continued for two hours at a temperature of 120° C. At the end of this two hour period, 4 percent by weight calcium hydroxide was added, based on the solids content of the resin, pressure was released and the system dehydrated. To the phenol-formaldehyde condensate there was then nadded 5 percent by weight ε-caprolactone and the resultant mixture heated at a temperature of 150° C. for one hour.

EXAMPLE 1

| Composition | Gel test, seconds | Viscosity, centistokes |
|---|---|---|
| Composition A | 50 | 14.7 |
| Composition B | 61 | 14.5 |
| Control 1 (same as Composition B without the ε-caprolactone) | 77 | 20 |

In conducting the "Gel Test," 10 percent by weight hexamethylenetetramine, based on the weight of the phenol-formaldehyde condensate, was added to Composition B and Control 1.

Viscosity determinations were made according to the procedure described in Union Carbide Corporation Test Method WC–609E1.

EXAMPLE 2

This example illustrates the excellent "toughness" possessed by the compositions of this invention.

Compositions, the formulations of which are noted below, in parts by weight, were prepared by blending the materials on a two-roll mill for a period of 85 seconds, wherein the temperature of the front roll was about 95° C. and the temperature of the back roll was about 150° C.

|  | Control 2 | Composition C |
|---|---|---|
| Phenol-formaldehyde resin (same as Control 1) | 43.00 |  |
| Composition B |  | 43.00 |
| Cotton flock | 9.00 | 9.00 |
| Wood flour | 11.25 | 11.25 |
| Asbestos | 21.50 | 21.50 |
| Nigrosine | 1.80 | 1.80 |
| Clay | 0.60 | 0.60 |
| Calcium stearate | 3.00 | 3.00 |
| Coal | 9.35 | 9.35 |
| Ball drop test, inches | 30 | 33 |

Comparable results as set forth in Examples 1 and 2 are achieved using the following lactones and Group II metal compounds:

(1) β-Methyl-ε-caprolactone
(2) β-Chloro-ε-caprolactone
(3) γ-Ethoxy-ε-caprolactone
(4) ε-Phenyl-ε-caprolactone
(5) Calcium oxide
(6) Magnesium oxide
(7) Magnesium hydroxide As previously stated the compositions of this invention are particularly suited for use in molding applications to form shaped articles. As examples of specific uses for these compositions can be noted—agitator blades for washing machines and handles for household appliances.

What is claimed is:

1. A phenolic resin composition consisting essentially of a phenol-aldehyde novolac condensate, formed in an acidic medium, a Group II metal hydroxide or oxide and an ε-caprolactone wherein the Group II metal hydroxide or oxide is present in an amount of about 1 percent by weight to about 15 percent by weight and the ε-caprolactone is present in an amount of about 1 percent by weight to about 50 percent by weight, based on the weight of said novolac condensate.

2. A composition as defined in claim 1 wherein the phenolic component of the phenol-aldehyde condensate is phenol.

3. A composition as denfied in claim 1 wherein the aldehyde is formaldehyde.

4. A composition as defined in claim 1 wherein the ε-caprolactone has the formula:

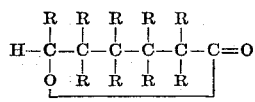

wherein each R is hydrogen, halogen, or a monovalent hydrocarbon radical containing a maximum of 12 carbon atoms and wherein at least six R's are hydrogen.

5. A composition as defined in claim 1 wherein the phenol-aldehyde condensate is a phenol-formaldehyde novolac resin.

6. A composition as defined in claim 5 wherein the composition contains a methylene generating compound.

7. A composition as defined in claim 6 wherein the methylene generating compound is hexamethylenetetramine.

8. A composition as defined in claim 5 wherein the lactone is ε-caprolactone.

9. The thermoset product of the composition defined in claim 6.

10. A composition as defined in claim 1 wherein the Group II metal compound is a Group II metal hydroxide.

11. A composition as defined in claim 1 wherein the Group II metal compound is a Group II metal oxide.

12. A composition as defined in claim 1 wherein the Group II metal hydroxide is calcium hydroxide.

13. A composition as defined in claim 1 wherein the Group II metal hydroxide is magnesium hydroxide.

14. A composition as defined in claim 1 wherein the Group II metal oxide is calcium oxide.

15. A composition as defined in claim 1 wherein the Group II metal oxide is magnesium oxide.

16. A composition as defined in claim 1 wherein the Group II metal compound is present in an amount of about 2 percent to about 10 percent by weight and the ε-caprolactone is present in an amount of about 5 percent to about 25 percent by weight.

References Cited

UNITED STATES PATENTS

| | | | |
|---|---|---|---|
| 2,288,533 | 6/1942 | Kreidl et al. | 260—59 X |
| 2,395,676 | 2/1946 | Luth et al. | 260—57 X |
| 2,520,913 | 9/1950 | Clark | 260—60 X |
| 2,606,888 | 8/1952 | Williams et al. | 260—59 |
| 2,619,460 | 11/1952 | Neff | 260—53 UX |
| 2,692,865 | 10/1954 | Harris | 260—59 X |
| 2,736,701 | 2/1956 | Neff | 260—60 X |
| 3,044,976 | 7/1962 | Brooks et al. | 260—60 X |

FOREIGN PATENTS

| | | |
|---|---|---|
| 1,065,605 | 3/1960 | Germany. |

HOWARD E. SCHAIN, Primary Examiner

U.S. Cl. X.R.

260—17.2 R, 37 N, 51 R, 52, 53 R, 54, 60; 264—331